(12) United States Patent
Gumprecht et al.

(10) Patent No.: US 11,325,555 B2
(45) Date of Patent: May 10, 2022

(54) VEHICLE SEAT

(71) Applicant: Faurecia Autositze GmbH, Stadthagen (DE)

(72) Inventors: Michael Gumprecht, Nassenfels (DE); Bertram Schillig, Wettstetten (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 16/987,714

(22) Filed: Aug. 7, 2020

(65) Prior Publication Data

US 2021/0039583 A1 Feb. 11, 2021

(30) Foreign Application Priority Data

Aug. 8, 2019 (DE) .................. 202019104372.5

(51) Int. Cl.
*B60R 21/231* (2011.01)
*B60N 2/20* (2006.01)
*B60R 21/207* (2006.01)
*B60R 21/2165* (2011.01)
*B60N 2/72* (2006.01)
*B60N 2/70* (2006.01)

(52) U.S. Cl.
CPC .......... *B60R 21/23138* (2013.01); *B60N 2/20* (2013.01); *B60N 2/72* (2013.01); *B60R 21/207* (2013.01); *B60R 21/2165* (2013.01); *B60N 2/7017* (2013.01); *B60R 2021/23146* (2013.01)

(58) Field of Classification Search
None
See application file for complete search history.

(56) References Cited

U.S. PATENT DOCUMENTS

| 5,441,331 A * | 8/1995 | Vento ...................... B60N 2/10 |
| | | 297/452.33 |
| 5,601,332 A | 2/1997 | Schultz |
| 6,802,563 B1 * | 10/2004 | Mysliwiec ............... B60N 2/99 |
| | | 297/284.9 |
| 8,662,531 B2 | 3/2014 | Tracht |
| 10,882,432 B1 * | 1/2021 | Bosen .................... B60N 2/986 |
| 10,967,772 B2 * | 4/2021 | Roman ................ B60N 2/5841 |
| 2012/0200123 A1 | 8/2012 | Sosnowski |

FOREIGN PATENT DOCUMENTS

| DE | 10160974 A1 | 6/2003 |
| DE | 102011086471 A1 | 5/2013 |

* cited by examiner

*Primary Examiner* — Faye M Fleming
(74) *Attorney, Agent, or Firm* — Barnes & Thornburg LLP

(57) ABSTRACT

A vehicle seat comprises a seating portion and a back rest the angle of inclination is adjustable in relation to the seating portion, where at least the back rest is of modular design made of a plurality of upholstered elements, the upholstered elements each comprising a preformed foam part surrounded, at least in part, by a cushion cover, the upholstered elements made in this manner are put together via fasteners in modular fashion to form the back rest adjustable in inclination.

20 Claims, 2 Drawing Sheets

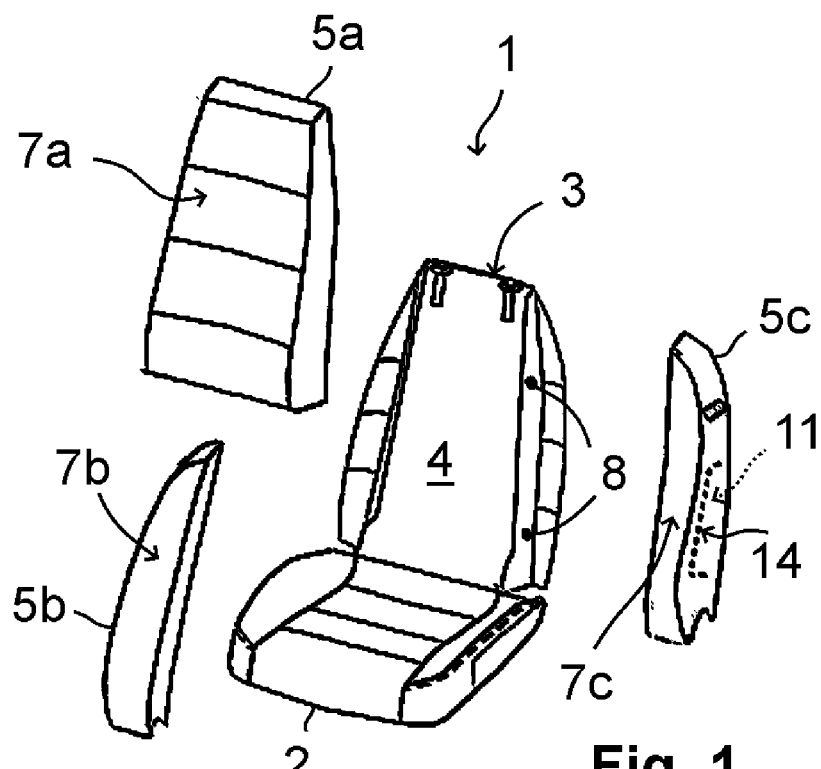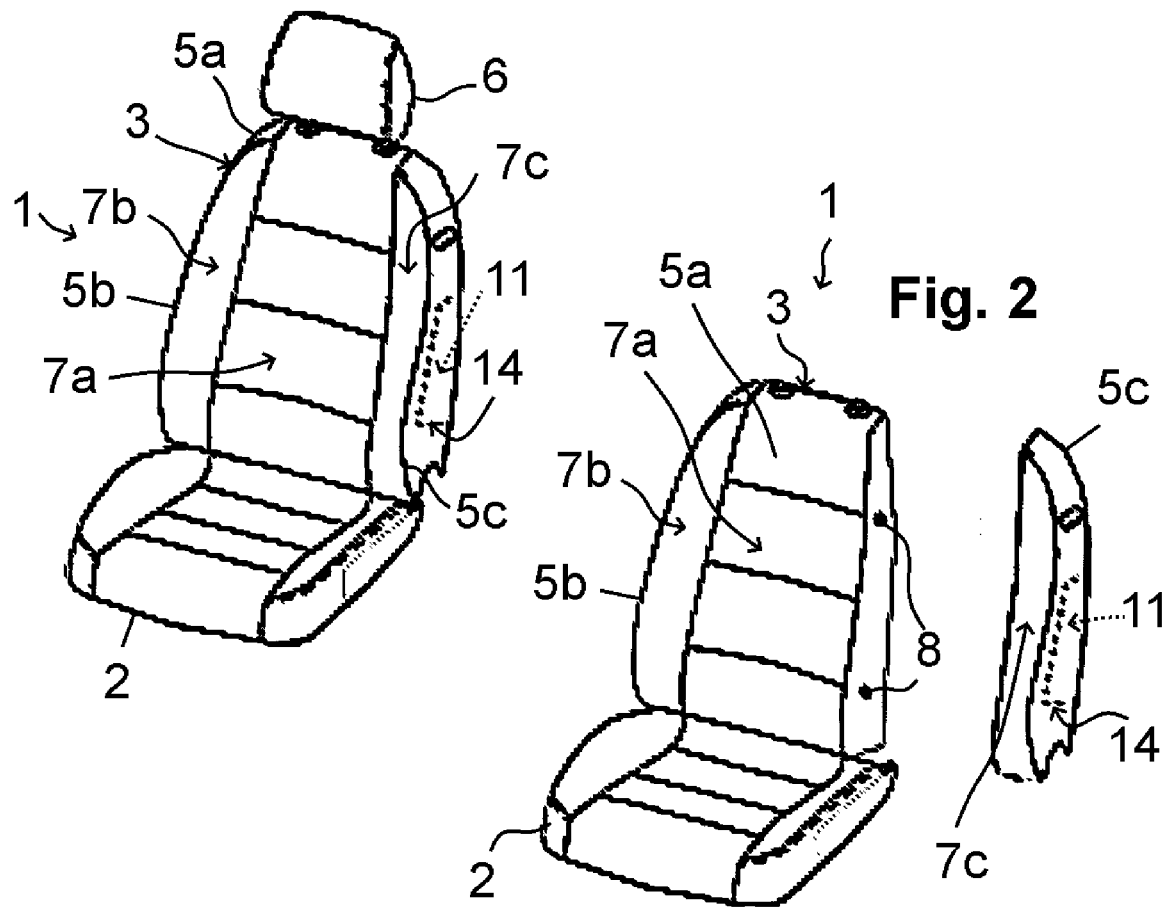

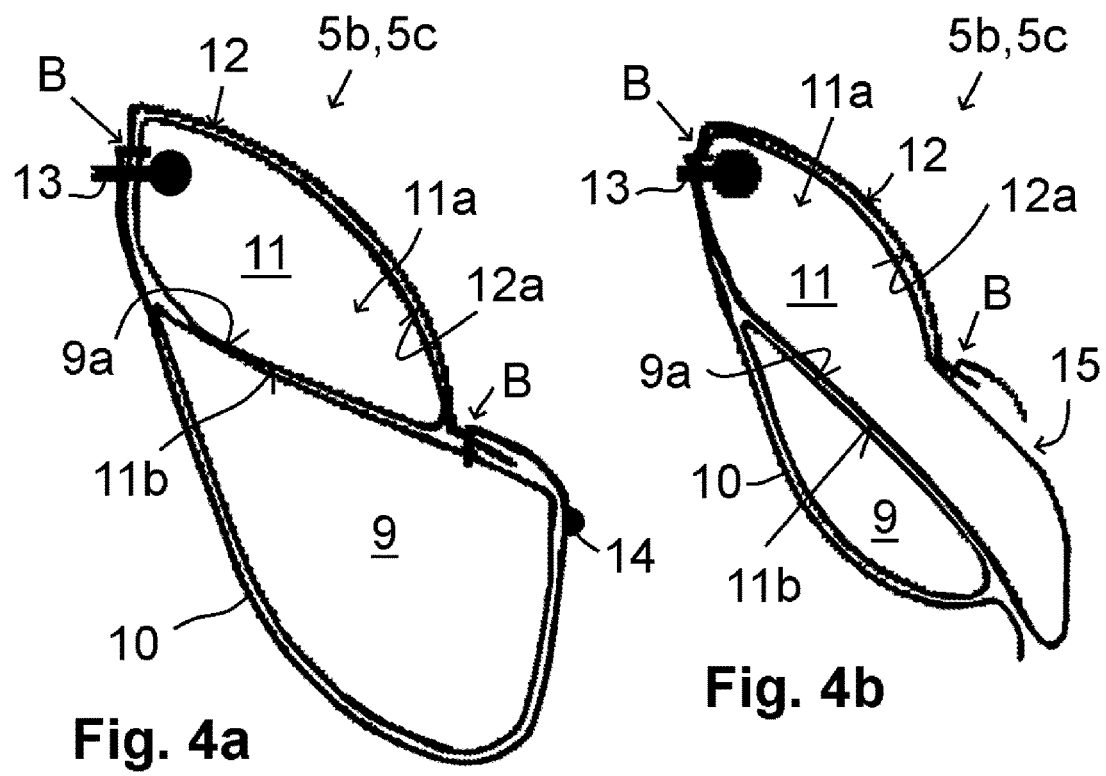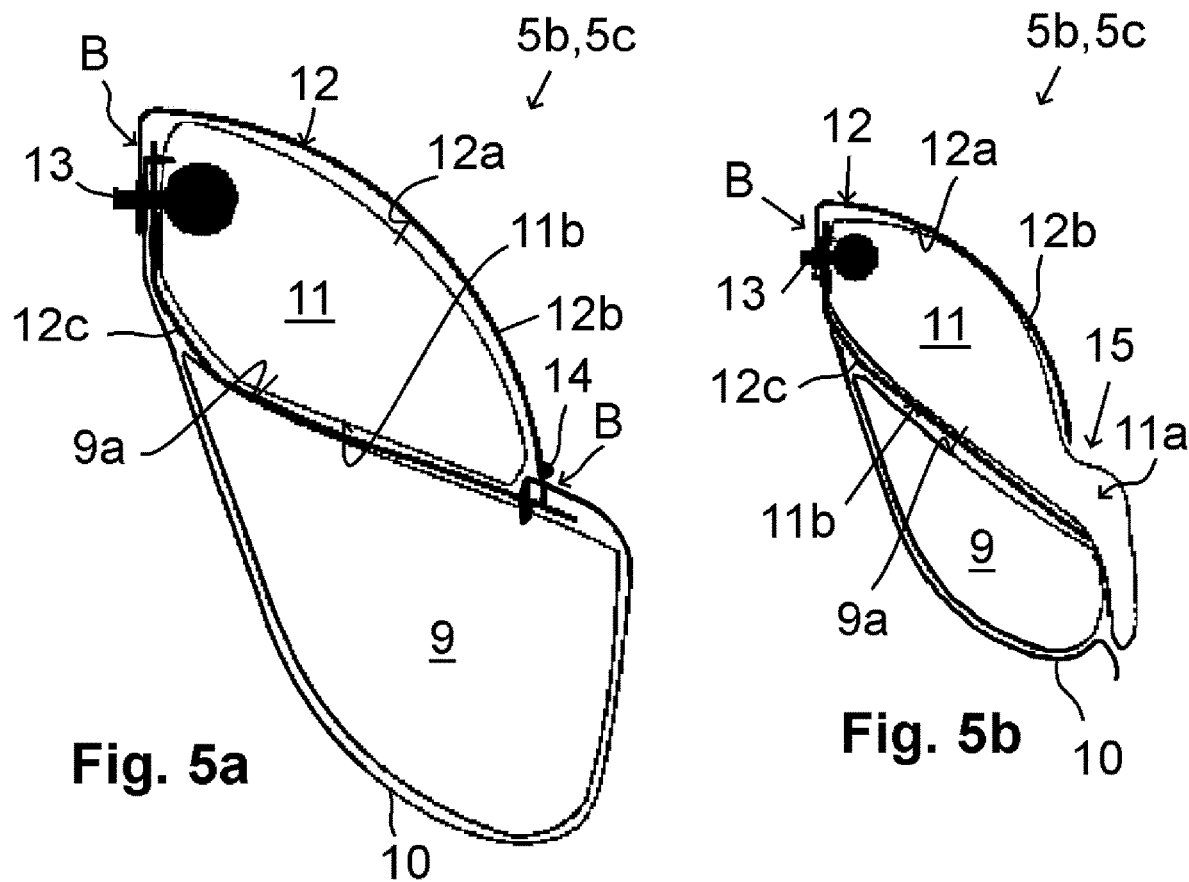

a vehicle seat.

VEHICLE SEAT

PRIORITY CLAIM

This application claims priority under to German Patent Application No. DE 20 2019 104 372.5, filed Aug. 8, 2019, which is expressly incorporated by reference herein.

BACKGROUND

The present disclosure relates to a seat, and particularly to a vehicle seat.

SUMMARY

According to the present disclosure, a modular designed vehicle seat is provided with a tilt adjustable back rest of which is put together in modular fashion from a plurality of upholstered elements with foam bodies arranged therein.

In illustrative embodiments, at least lateral upholstered elements, which form lateral support areas at the modular back rest, comprise an airbag module with an inflatable, unfolding air cushion, the airbag module being fitted in or, respectively, received in a supporting body of the lateral upholstered element and the airbag module being arranged adjacent to the foam part in the lateral upholstered element in such a way that the air cushion, when the airbag module is triggered, can be purposefully guided through an opening that can be formed between the foam part and the supporting body.

In illustrative embodiments, a modular designed vehicle seat is provided the tilt adjustable back rest of which is put together in modular fashion from a plurality of upholstered elements with foam bodies arranged therein, whereby at least lateral upholstered elements, which form lateral support areas at the modular back rest, comprise an airbag module with an inflatable, unfolding air cushion, the airbag module being fitted in or, respectively, received in a supporting body of the lateral upholstered element and the airbag module being arranged adjacent to the foam part in the lateral upholstered element in such a way that the air cushion, when the airbag module is triggered, can be purposefully guided through an opening that can be formed between the foam part and the supporting body.

In illustrative embodiments, a pre-fabricable upholstered element is provided, into which an airbag module can be integrated in a simple manner, whereby the foam part itself remains undamaged in the event of the airbag module being triggered because the air cushion unfolds not through an opening in the foam part. This can also minimize or avoid foam particles from flying around.

In illustrative embodiments, it is very simple to manufacture such a lateral upholstered element for vehicle seat of modular design because no costly adaptations to the foam body and the airbag module in relation to each other are required. Rather, these can be positioned in a simple manner adjacent to one another in the upholstered element and, preferably, surrounded towards the outside merely by the supporting body and by the cushion cover, for example, made of leather, fabric or synthetic leather. Hereby, the foam part can be manufactured in advance in a simple manner in a foam-in-place process or directly adjacent to the airbag module. The supporting body and the cushion cover may be connected to each other in a simple manner along a line of fixation depending on the size of the airbag module so that a variable construction is also possible, where the airbag module and the foam part are protected towards the outside.

In illustrative embodiments, it may be provided that in the cushion cover a tear seam is formed as a predetermined rupture point or, respectively, rated breaking point, whereby the opening for unfolding the air cushion may be formed preferably along the tear seam when the airbag module is triggered so as to purposefully guide the air cushion. Thus, it is possible in a simple manner to predefine a direction for the air cushion, whereby, according to this embodiment, it is preferably provided that the foam part is in planar contact within the lateral upholstered element with a first contact surface on a second contact surface of the airbag module, and the tear seam is arranged approximately on an extension of the first contact surface of the cushion part and the second contact surface of the airbag module. This makes it possible for the air cushion, when the airbag module is triggered, to be guided purposefully through an opening forming between the foam part and the supporting body.

In illustrative embodiments, it is provided that the supporting body, in which the airbag module is fitted in or, respectively, received, is designed as two parts, namely a first supporting body region and a second supporting body region, with the second supporting body region being arranged between the foam part and the airbag module, and the first supporting body region closing, at least in part, the lateral upholstered element outwardly, where the two supporting body regions can be separated from each other in certain regions so that, when the airbag module is triggered, an opening between the two supporting body regions can form such that the air cushion air cushion can be purposefully guided outwards between the foam part and the supporting body.

Thus, in this embodiment, too, the foam part is still arranged adjacent to the airbag module in the lateral upholstered element, however, separated from this by the second supporting body region and thereby protected. When triggered, the inflating air cushion will be guided through the opening by the two supporting body region separating from each other so that here, too, damage to the foam body is avoided. Moreover, the air cushion is not blocked by the foam part upon unfolding because it is guided past this.

It is further provided for the first supporting body region to be made of metal and the second supporting body region of an elastic material, for example, plastics. Thus a secure fixation and protection against outside influence can be achieved using the first supporting body region, which the second supporting body region enables a resilience of the supporting body when the airbag module or, respectively, the air cushion unfolds. This facilities a reliable unfolding of the air cushion through the opening.

It is further provided that the fastener for modular assembling the upholstered elements, in which airbag module is received and fitted in, is connected to the supporting body. Hereby, a reliable fixation of the pre-fabricated upholstered element as well as a secure hold of the airbag module, in particular, when triggered, ca n be achieved because this is arranged immediately adjacent to the fastener in the upholstered element.

It is further provided for the vehicle seat to be a front seat of a vehicle. In a modular design of the front seat the solution according to the present disclosure creates a simple option for integration of the airbag module into the back rest when only limited installation space is available. By virtue of this solution damage to the foam body is avoided or minimized.

In illustrative embodiments, it is provided for the back rest to be modular composed of two lateral upholstered elements for forming lateral support regions and a central upholstered element for forming a back support regions. Hereby, the upholstered elements of the back rest may be modular affixed to a retaining plate via the fastener, and/or at least some of the upholstered elements are modular affixed to one another directly via the fastener. Thus, the design according to the present disclosure can be utilized in various modular solutions in a simple manner.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a modular designed vehicle seat with various upholstered elements according to a first embodiment;

FIG. 2 shows a modular designed vehicle seat with various upholstered elements according to a second embodiment;

FIG. 3 shows the modular vehicle seats according to the FIGS. 1 and 2 in the assembled state;

FIGS. 4a and 4b are a sectional views of an upholstered element forming a lateral region of the back rest of the vehicle seat according to FIG. 1 or FIG. 2 in an embodiment variant; and FIGS. 5a and 5b are sectional views of an upholstered element forming a lateral region of the back rest of the vehicle seat according to FIG. 1 or FIG. 2 in a further embodiment variant.

DETAILED DESCRIPTION

In FIG. 1 a first embodiment example of a modular design vehicle seat 1 is shown, comprising a seating portion 2 as well as a back rest 3. According to this embodiment, the back rest 3 is formed from a retaining plate 4 as well as three upholstered elements 5a, 5b, 5c. The three upholstered elements 5a, 5b, 5c cam be modular affixed to the retaining plate 4 so as to form the back rest 3 according to FIG. 3, whereby, in addition, a head rest 6 may be affixed to the back rest 3 or, respectively, the retaining plate 4.

A central upholstered element 5a is arranged centrally on the back rest 3 and, together with its front side facing the occupant, forms a back support area 7a that may be structured accordingly. Lateral upholstered elements 5b, 5c are arranged laterally on the back rest 3 and form lateral support areas 7b, 7c, for example, for the shoulders and the arms of the occupant. To that end, the lateral upholstered elements 5b, 5c protrude forward a little in relating to the central upholstered element 5a. Further, the two lateral upholstered elements 5b, 5c limit the vehicle seat 1 towards the sides.

The modular designed vehicle seat 1 according to FIG. 2 differs from the modular constructed vehicle seat 1 according to FIG. 1 merely in that the lateral upholstered elements 5b, 5c forming the lateral support areas 7b, 7c are affixed not to the retaining plate 4 but directly to the central upholstered element 5a which forms the back support area 7a. Thus, the modular construction of the vehicle seat 1 can be achieves in different ways. In each case, the vehicle seat 1 is constructed from a plurality of upholstered elements 5a, 5b, 5c which can be assembled accordingly so as to form the back rest 3. The back rest 3 may also be formed from more than three upholstered elements 5a, 5b, 5c. The seating portion 2, too, may be assembled in this modular fashion.

Each upholstered element 5a, 5b, 5c comprises a foam part 9, and this is shown in exemplary fashion for the lateral upholstered elements 5b, 5c in the sectional views in the FIGS. 4a and 5a. The foam part 9 is brought into a pre-determined shape in a corresponding foaming process, e.g. foam-in-place. The foam part 9 of the respective upholstered element 5a, 5b, 5c is surrounded, at least in part, by a cushion cover 10 made of, for example, fabric, leather or synthetic leather.

The lateral upholstered elements 5b, 5c or one of the two lateral upholstered elements 5b, 5c additionally comprise or, respectively, comprises an airbag module 11. The airbag module 11 comprises, in a known manner, an inflatable air cushion 11a into which air can be introduced in a burst via a gas generator (not shown) so as to unfold the air cushion 11a to protect an occupant, whereby, to that end, a tear seam 14 in the respective lateral upholstered element 5b, 5c opens up. In its non-unfolded state the airbag module 11 or, respectively, the air cushion 11a is fitted in a supporting body 12 of the respective lateral upholstered element 5b, 5c lying, at least in part, in contact with an interior wall 12a of the supporting body 12.

The supporting body 12 closes the lateral upholstered elements 5b, 5c together with the cushion cover 10 towards the outside so that the foam part 9 and the airbag module 11 are completely surrounded towards the outside by these two elements 10, 12. The supporting body 12 and the cushion cover 10 are connected to one another along a certain line of fixation B (see FIG. 4a, 5a), the line of fixation B extending, depending on the shape of the supporting body 12 or, respectively, the size of the airbag module 11, along a circumferential line.

By means of fasteners 13 the lateral upholstered elements 5a, 5b including the airbag module 11 and the foam part 9 can be affixed to any element, in particular, to the retaining plate 4 (FIG. 1) or, respectively, the central upholstered element 5a (FIG. 2). To that end, mounting holes 8 may be provided in the respective element 4, 5a into which the fasteners 13 can be inserted to allow modular assembling of the back rest 3.

In this embodiment, the fastener 13 is disposed in the region of the supporting body 12 or, respectively, the airbag module 11. This can achieve, by an attachment of the lateral upholstered element 5b, 5c via the fastener 13, at the same time, also a secure positioning and fixation of the supporting body 12 with the airbag module 11 contained therein, in particular, when the air cushion 11a unfolds in a burst upon triggering of the airbag.

In the embodiment of FIGS. 4a and 4b, a first contact surface 9a of the foam part 9 is in immediate contact with a second contact surface 11b on the air cushion 11a inside the lateral cushion part 5a, 5b. According to this embodiment, a tear seam 14 is provided in the cushion cover 10 the tear seam being arranged approximately on an extension of the first contact surface 9a of the cushion part 9 or, respectively, of the second contact surface 111b of the airbag module 11. The tear seam 14 serves as a predetermined rupture point in the cushion cover 10 which is biased to rupture upon triggering of the airbag module 11 or, respectively, upon the air cushion 11a unfolding in a burst, thereby predefining a preferred direction for unfolding of the air cushion 11a. Thus, the air cushion 11a escapes the lateral upholstered element 5a, 5b through an opening 15 formed so as to protect the occupant from impact, in a known fashion.

According to FIG. 4b, in which the airbag is shown when it has been triggered, the foam part 9 is merely slightly pushed forwards towards the occupant and, possibly, deformed upon unfolding of the air cushion 11a. By virtue of the arrangement of the tear seam 14 a way along the first contact surface 9a at the foam part 9 is predefined for the air cushion 11a, where the air cushion 11a does not penetrate the foam part 9 itself and merely deforms it, if even that. Thus, the foam part 9 remains undamaged upon triggering of the airbag, and foam parts flying around is avoided.

For manufacturing a lateral upholstered element 5b, 5c according to FIG. 4a and FIG. 4b it may be provided, for example, to place a provided airbag module 11 into the supporting body 12 so that this is in contact with the interior wall 12a of the supporting body 12 and is fitted in therein. Thereafter, the foam part 9 is manufactured in a foaming process, for example foam-in-place, with a corresponding shape and placed in contact with the second contact surface 11b of the air cushion 11a or foamed directly onto this. Subsequently, as shown in FIG. 4a, the cushion cover 10 is placed around the previously formed foam part 9 as a cover and connected to the supporting body 12 along the line of fixation B. The tear seam 14 is formed in advance or later.

In the embodiment of the FIGS. 5a and 5b, the foam part 9 is not in immediate contact with the air cushion 11a. Rather, a supporting body 12 is provided which completely surrounds the airbag module 11. To that end, the supporting body 12 is designed, for example, as two parts, whereby a first supporting body region 12b is provided which may be made, for example, of a metal, and a second supporting body region 12c which may be made from an elastic material, for example, plastics or a reinforced fabric. The two supporting body regions 12a, 12b are connected to one another and can be affixed to the respective element 4, 5a via the fastener 13.

The foam part 9 with the first contact surface 9a is in contact with the second supporting body region 12c so that, in contrast to the embodiment example according to FIGS. 4a and 4b, the second supporting body region 12c lies between the foam part 9 and the airbag module 11. Here, too, the foam part 9 in enclosed by the cushion cover 10, whereby, likewise, the cushion cover 10 is affixed to the supporting body 12, made of two parts here, via the line of fixation B.

In this embodiment example, too, a tear seam 14 may be provided serving as predetermined rupture point and being biased to rupture upon triggering of the airbag module 11 or, respectively, upon unfolding of the air cushion 11a in a burst, thereby predefining a preferred direction for unfolding for the air cushion 11a. In the alternative, the tear seam 14 may also be omitted. The direction for unfolding of the air cushion 11a of the airbag module 11 will then be predefined in that, as shown in FIG. 5b, the two supporting body regions 12b, 12c are automatically pushed apart or, respectively, fold open upon triggering of the airbag module 11 so as to form an opening 15. The opening 15 is disposed opposite the fastener 13 on the lateral upholstered element 5b, 5c and allows focused unfolding of the air cushion 11a in a lateral direction so as to achieve side impact protection for occupants. In this embodiment example, too, the foam part 9 does not impede the air cushion 11a unfolding towards the side. Moreover, the foam part 9 is protected from damage by the second supporting body region 12c.

Thus, in both embodiment examples, for a modular designed vehicle seat 1, it is possible each to provide a lateral upholstered element 5b, 5c for the back rest 3 of the vehicle seat 1 into which an airbag module 11 can be integrated in a simple manner. Upon triggering the airbag the air cushion 11a can be made to unfold in a focused manner towards the side without the foam part 9 being an impediment hereby or, respectively, being damaged upon unfolding. Moreover, since the airbag module 11 is not arranged inside the foam body 9, rather, the foam part 9 lying in planar contact therewith or being separated there from by the second supporting body region 12b, it is easy to manufacture such a lateral upholstered element 5b, 5c.

Comparative vehicle seats comprise a seating portion and a back rest which can be adjusted in the angle of inclination in relation thereto, whereby both the seating portion and the back rest comprise a foam part surrounded by a cushion cover, which is formed into the corresponding shape in advance, for example in a foam-in-place process. The back rest and the seating portion may be designed, for example, as one piece einstückig and form, correspondingly, various upholstered support areas for the back, the arms, the shoulders, as well as the legs and the buttocks of the occupant.

In a comparative modular design, the back rest is put together from a plurality of individual upholstered elements. Hereby, a central upholstered element may form a back support area and lateral upholstered elements lateral support areas for the arms and the shoulders of the occupant. By assembling these individual, prefabricated upholstered elements using fasteners the back rest can be formed, whereby individual allocation enables a modular and flexible design. In principle, it is also possible to have a modular design of the seating portion made up of a plurality of upholstered elements in a similar manner.

It is a disadvantage of such a comparative modular design that it is cumbersome to integrate airbag modules for protecting occupants into such pre-fabricated upholstered elements that are part of the modular design back rest. In particular, when arranging an airbag module inside the lateral upholstered elements forming the lateral support region, there will be very little assembly space making its incorporation difficult.

In a comparative vehicle seat, an inflatable air cushioning is arranged in a lateral upholstered element of a vehicle seat. Therein, it is provided to form a side impact element with an air cushion which will be inflated within a foam body in the lateral upholstered element in the event of an impact so as to provide for additional cushioning for an occupant. Hereby, a slot is introduced into the foam part which, when the side impact element is triggered, leads to the foam body to rip apart at a pre-determined spot thereby purposefully forming an opening for unfolding the inflatable aircushion. Hereby, it is a disadvantage that the foam part itself is damaged and, therefore, cannot be re-used, and that parts of the foam part may fly around when the side impact element is triggered. Moreover, such a lateral upholstered element with the side impact element is costly to manufacture.

A comparative vehicle seat may integrate an airbag module into an upholstered element which is arranged adjacent to the vehicle seats in the rear section of a vehicle as side panel of the car body. Hereby, occupants seated in a back seat can be protected in case of an impact by means of the inflating air cushion of the airbag module.

A vehicle seat in accordance with the present disclosure is modular designed and easy to manufacture, and which maximizes the safety of the occupants.

According to the present disclosure, a modular designed vehicle seat is provided the tilt adjustable back rest of which is put together in modular fashion from a plurality of upholstered elements with foam bodies arranged therein, whereby at least lateral upholstered elements, which form lateral support areas at the modular back rest, comprise an airbag module with an inflatable, unfolding air cushion, the airbag module being fitted in or, respectively, received in a supporting body of the lateral upholstered element and the airbag module being arranged adjacent to the foam part in the lateral upholstered element in such a way that the air cushion, when the airbag module is triggered, can be purposefully guided through an opening that can be formed between the foam part and the supporting body.

A pre-fabricable upholstered element is provided, into which an airbag module can be integrated in a simple manner, whereby the foam part itself remains undamaged in the event of the airbag module being triggered because the air cushion unfolds not through an opening in the foam part. This can also prevent foam particles from flying around.

Moreover, it is very simple to manufacture such a lateral upholstered element for vehicle seat of modular design because no costly adaptations to the foam body and the airbag module in relation to each other are required. Rather, these can be positioned in a simple manner adjacent to one another in the upholstered element and, preferably, surrounded towards the outside merely by the supporting body and by the cushion cover, for example, made of leather, fabric or synthetic leather. Hereby, the foam part can be manufactured in advance in a simple manner in a foam-in-place process or directly adjacent to the airbag module. The supporting body and the cushion cover may be connected to each other in a simple manner along a line of fixation depending on the size of the airbag module so that a variable construction is also possible, where the airbag module and the foam part are protected towards the outside.

According to one embodiment, it may be provided that in the cushion cover a tear seam is formed as a predetermined rupture point or, respectively, rated breaking point, whereby the opening for unfolding the air cushion may be formed preferably along the tear seam when the airbag module is triggered so as to purposefully guide the air cushion. Thus, it is possible in a simple manner to predefine a direction for the air cushion, whereby, according to this embodiment, it is preferably provided that the foam part is in planar contact within the lateral upholstered element with a first contact surface on a second contact surface of the airbag module, and the tear seam is arranged approximately on an extension of the first contact surface of the cushion part and the second contact surface of the airbag module. Advantageously, this makes it possible for the air cushion, when the airbag module is triggered, to be guided purposefully through an opening forming between the foam part and the supporting body.

According to another embodiment, it is provided that the supporting body, in which the airbag module is fitted in or, respectively, received, is designed as two parts, namely a first supporting body region and a second supporting body region, with the second supporting body region being arranged between the foam part and the airbag module, and the first supporting body region closing, at least in part, the lateral upholstered element outwardly, where the two supporting body regions can be separated from each other in certain regions so that, when the airbag module is triggered, an opening between the two supporting body regions can form such that the air cushion air cushion can be purposefully guided outwards between the foam part and the supporting body.

Thus, in this embodiment, too, the foam part is still arranged adjacent to the airbag module in the lateral upholstered element, however, separated from this by the second supporting body region and thereby protected. When triggered, the inflating air cushion will be guided through the opening by the two supporting body region separating from each other so that here, too, damage to the foam body is avoided. Moreover, the air cushion is not blocked by the foam part upon unfolding because it is guided past this.

Preferably, it is further provided for the first supporting body region to be made of metal and the second supporting body region of an elastic material, for example, plastics. Thus a secure fixation and protection against outside influence can be achieved using the first supporting body region, which the second supporting body region enables a resilience of the supporting body when the airbag module or, respectively, the air cushion unfolds. This facilities a reliable unfolding of the air cushion through the opening.

It is further provided that the fastener for modular assembling the upholstered elements, in which airbag module is received and fitted in, is connected to the supporting body. Hereby, a reliable fixation of the pre-fabricated upholstered element as well as a secure hold of the airbag module, in particular, when triggered, ca n be achieved because this is arranged immediately adjacent to the fastener in the upholstered element.

It is further provided for the vehicle seat to be a front seat of a vehicle. In a modular design of the front seat the solution according to the present disclosure creates a simple option for integration of the airbag module into the back rest when only limited installation space is available. By virtue of this solution damage to the foam body is avoided.

According to a preferred embodiment it is provided for the back rest to be modular composed of two lateral upholstered elements for forming lateral support regions and a central upholstered element for forming a back support regions. Hereby, the upholstered elements of the back rest may be modular affixed to a retaining plate via the fastener, and/or at least some of the upholstered elements are modular affixed to one another directly via the fastener. Thus, the design according to the present disclosure can be utilized in various modular solutions in a simple manner.

The present disclosure relates to a vehicle seat 1 comprising a seating portion 2 and a back rest 3 the angle of inclination is adjustable in relation to the seating portion 2, where at least the back rest 3 is of modular design made of a plurality of upholstered elements 5a, 5b, 5c, the upholstered elements 5a, 5b, 5c each comprising a preformed foam part 9 surrounded, at least in part, by a cushion cover 10, the upholstered elements 5a, 5b, 5c made in this manner are put together via fasteners 13 in modular fashion to form the back rest 3 adjustable in inclination.

It is provided that at least lateral upholstered elements 5b, 5c which form the lateral support areas 7b, 7c on the modular back rest 3 comprise an airbag module 11 with an inflatable air cushion 11a, the airbag module 11 being fitted into place in a supporting body 12 of the lateral upholstered element 5b, 5c and the airbag module 11 being arranged adjacent to the foam part 9 in the lateral upholstered element 5b, 5c such that the air cushion 11a, when inflated upon triggering of the des airbag module 11, can be purposefully guided through an opening 15 that can be formed between the foam part 9 and the supporting body 12.

The invention claimed is:

1. A vehicle seat comprising
a seating portion and
a back rest in which an angle of inclination is adjustable in relation to the seating portion, where at least the back rest is of modular design made of a plurality of upholstered elements, the upholstered elements each comprising a preformed foam part surrounded, at least in part, by a cushion cover, the upholstered elements made in this manner put together via fasteners in modular fashion to form the back rest adjustable in inclination, wherein at least lateral upholstered elements which form lateral support areas on the modular back rest comprise an airbag module with an inflatable air cushion, the airbag module being fitted into place in a supporting body of the lateral upholstered elements and the airbag module being arranged adjacent to the foam part in the lateral upholstered element such that the air cushion, when inflated upon triggering of the airbag module, can be purposefully guided through an opening that can be formed between the foam part and the supporting body and wherein the upholstered elements of the back rest are affixed in modular fashion via the fasteners to a retaining plate and/or at least some of the upholstered elements are affixed in modular fashion directly to one another via the fasteners.

2. The vehicle seat of claim 1, wherein the opening does not pass through the foam part.

3. The vehicle seat of claim 1, wherein the lateral upholstered element with the airbag module, the foam part, the supporting body, and the cushion cover are pre-fabricated so as to allow modular assembly of the back rest of the vehicle seat.

4. The vehicle seat of claim 1, wherein the supporting body and the cushion cover are connected to one another along a line of fixation.

5. The vehicle seat of claim 1, wherein the supporting body and the cushion cover together entirely surround the foam part and the airbag module outwardly.

6. The vehicle seat of claim 1, wherein a tear seam is formed in the cushion cover as a predetermined rupture point, where the opening can form along the tear seam when the airbag module is triggered for purposefully guiding the air cushion.

7. The vehicle seat of claim 6, wherein the foam part lies, within each lateral upholstered element, with a first contact surface in planar contact with a second contact surface of the airbag module, and the tear seam is arranged approximately on an extension of the first contact surface of the foam part and the second contact surface of the airbag module.

8. The vehicle seat of claim 1, wherein the supporting body into which the airbag module is fit into place is designed as two parts made up of a first supporting body region and a second supporting body region, the second supporting body region being arranged between the foam part and the airbag module, and the first supporting body region closing, at least in part, the lateral upholstered element outwardly, where the two supporting body regions can be separate from each other in certain regions so that, when the airbag module is triggered, an opening between the two supporting body regions can form such that the air cushion can be purposefully guided outwards between the foam part and the supporting body.

9. The vehicle seat of claim 8, wherein the first supporting body region is made of metal, and the second supporting body region is made of an elastic material, for example, plastics or a reinforced fabric.

10. The vehicle seat of claim 1, wherein the fastener for modularly assembling the upholstered elements is connected to the supporting body in which the airbag module is received and fit in place.

11. The vehicle seat of claim 1, wherein the vehicle seat is a front seat of a vehicle.

12. The vehicle seat of claim 1, wherein the back rest is put together in modular fashion by two lateral upholstered elements to form the lateral support areas and a central upholstered element to form a back support region.

13. The vehicle seat of claim 1, wherein the foam part of each respective upholstered element is produced in a foam-in-place process.

14. A vehicle seat comprising
a seating portion and
a back rest in which an angle of inclination is adjustable in relation to the seating portion, where at least the back rest is of modular design made of a plurality of upholstered elements, the upholstered elements each comprising a preformed foam part surrounded, at least in part, by a cushion cover, the upholstered elements made in this manner put together via fasteners in modular fashion to form the back rest adjustable in inclination,
wherein at least lateral upholstered elements which form lateral support areas on the modular back rest comprise an airbag module with an inflatable air cushion, the airbag module being fitted into place in a supporting body of the lateral upholstered elements and the airbag module being arranged adjacent to the foam part in the lateral upholstered element such that the air cushion, when inflated upon triggering of the airbag module, can be purposefully guided through an opening that can be formed between the foam part and the supporting body,
wherein the supporting body into which the airbag module is fit into place is designed as two parts made up of a first supporting body region and a second supporting body region, the second supporting body region being arranged between the foam part and the airbag module, and the first supporting body region closing, at least in part, the lateral upholstered element outwardly, and
wherein the two supporting body regions can be separate from each other in certain regions so that, when the airbag module is triggered, an opening between the two supporting body regions can form such that the air cushion is guided outwards between the foam part and the supporting body.

15. The vehicle seat of claim 14, wherein the first supporting body region is made of metal, and the second supporting body region is made of an elastic material.

16. The vehicle seat of claim 14, wherein a tear seam is formed in the cushion cover as a predetermined rupture point, and the opening forms along the tear seam when the airbag module is triggered to guide the air cushion, and
wherein the foam part lies within each lateral upholstered element with a first contact surface in planar contact with a second contact surface of the airbag module, and the tear seam is arranged approximately on an extension of the first contact surface of the foam part and the second contact surface of the airbag module.

17. A vehicle seat comprising
a seating portion and
a back rest in which an angle of inclination is adjustable in relation to the seating portion, where at least the back rest is of modular design made of a plurality of upholstered elements, the upholstered elements each comprising a preformed foam part surrounded, at least in part, by a cushion cover, the upholstered elements made in this manner are put together via fasteners in modular fashion to form the back rest adjustable in inclination,
wherein at least lateral upholstered elements which form lateral support areas on the modular back rest comprise an airbag module with an inflatable air cushion, the airbag module being fitted into place in a supporting body of the lateral upholstered elements and the airbag module being arranged adjacent to the foam part in the lateral upholstered element such that the air cushion, when inflated upon triggering of the airbag module, can be purposefully guided through an opening that can be formed between the foam part and the supporting body, wherein the foam part of each respective upholstered element is produced in a foam-in-place process.

18. The vehicle seat of claim 17, wherein the opening does not pass through the foam part.

19. The vehicle seat of claim 17, wherein the lateral upholstered element with the airbag module, the foam part, the supporting body, and the cushion cover are pre-fabricated so as to allow modular assembly of the back rest of the vehicle seat.

20. The vehicle seat of claim 17, wherein the supporting body and the cushion cover are connected to one another along a line of fixation.

* * * * *